CARD READOUT SYSTEM

Filed Sept. 29, 1958 5 Sheets-Sheet 1

INVENTORS:
Kenneth O. King
Constantine M. Melas
By Louis A. Kline
John T. Matlago
Their Attorneys INVENTORS:
Kenneth O. King
Constantine M. Melas By Louis A Kline
John J. Matlago
Their Attorneys Dec. 13, 1960 K. O. KING ET AL 2,964,238
CARD READOUT SYSTEM
Filed Sept. 29, 1958 5 Sheets-Sheet 3
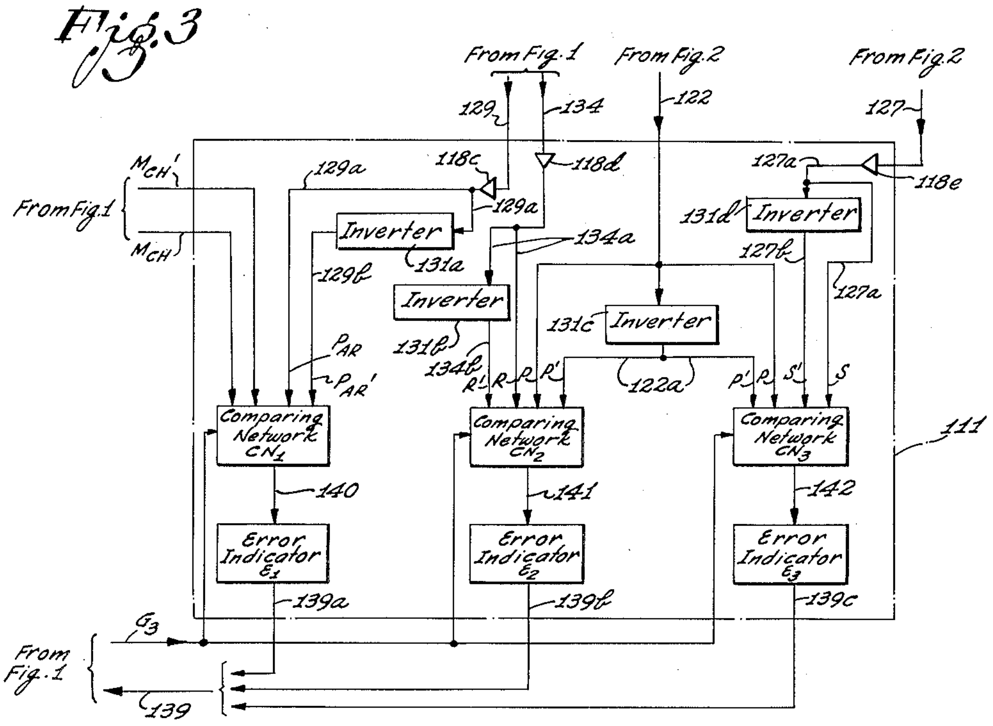
Fig. 3
Fig. 4
| Character | Card Code | | | | | Buffer Code | | | | | "P" Array Cores |
|---|---|---|---|---|---|---|---|---|---|---|---|
| | $K_1$ | $K_2$ | $K_3$ | $K_4$ | $K_5$ | $M_{CH}$ | $M_4$ | $M_3$ | $M_2$ | $M_1$ | |
| 0 | X | | | | | 1 | 0 | 0 | 0 | 0 | P1 |
| 1 | | X | | | | 0 | 0 | 0 | 0 | 1 | P2 |
| 2 | | | X | | | 0 | 0 | 0 | 1 | 0 | P3 |
| 3 | | | | X | | 1 | 0 | 0 | 1 | 1 | P4 |
| 4 | | | | | X | 0 | 0 | 1 | 0 | 0 | P5 |
| 5 | X | X | | | | 1 | 0 | 1 | 0 | 1 | P6 |
| 6 | X | | X | | | 1 | 0 | 1 | 1 | 0 | P7 |
| 7 | X | | | X | | 0 | 0 | 1 | 1 | 1 | P8 |
| 8 | X | | | | X | 0 | 1 | 0 | 0 | 0 | P9 |
| 9 | | X | X | | | 1 | 1 | 0 | 0 | 1 | P10 |
| A | | X | | X | | 1 | 1 | 0 | 1 | 0 | P11 |
| B | | X | | | X | 0 | 1 | 0 | 1 | 1 | P12 |
| C | | | X | X | | 1 | 1 | 1 | 0 | 0 | P13 |
| $ | | | X | | X | 0 | 1 | 1 | 0 | 1 | P14 |
| • | | | | X | X | 0 | 1 | 1 | 1 | 0 | P15 |
| , | X | X | X | | | 1 | 1 | 1 | 1 | 1 | P16 |
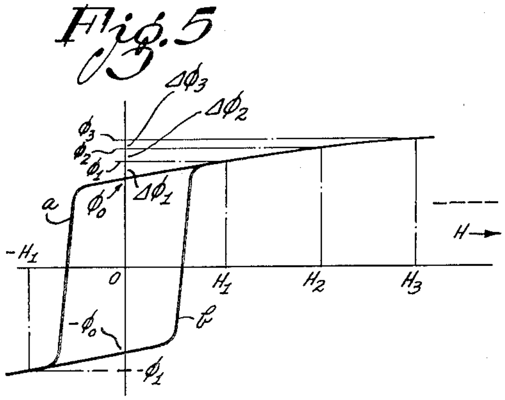
Fig. 5
INVENTORS:
Kenneth O. King
Constantine M. Melas
Louis A. Kline
By John J. Matlago
Their Attorneys INVENTORS:
Kenneth O. King
Constantine M. Melas
By Louis A. Kline
John T. Matlago
Their Attorneys Dec. 13, 1960 K. O. KING ET AL 2,964,238

CARD READOUT SYSTEM

Filed Sept. 29, 1958 5 Sheets-Sheet 5

INVENTORS:
Kenneth O. King
Constantine M. Melas
By Louis A. Kline
John J. Matlago
Their Attorneys

United States Patent Office 2,964,238

Patented Dec. 13, 1960

2,964,238

CARD READOUT SYSTEM

Kenneth O. King, Torrance, and Constantine M. Melas, Saratoga, Calif., assignors to The National Cash Register Company, Dayton, Ohio, a corporation of Maryland Filed Sept. 29, 1958, Ser. No. 763,879

13 Claims. (Cl. 234—58)

The present invention relates generally to readout systems for high-speed computing devices and more particularly to means for translating data signals as read out of a storage device into signals useful for punching record cards.

In the computer art it has previously been shown how apparatus can be provided for converting electrical data signals as transmitted from a storage device to thereby provide signals for punching a record medium or card. The typical record card defines a plurality of rows and a plurality of columns, each column containing one or more punches to represent a character. Since there are generally more columns than rows, and it takes appreciable time to physically move the card, the card handling mechanism operates to reposition the card to successive rows rather than successive columns for maximum speed. Hence, to generate the punch signals required in a given row, all the characters stored in the storage device must be read out or scanned to determine which of the columns requires a punch signal, and then after performing the punching operation the card is repositioned to the next row. Thus, to punch the full card, all the characters in the storage device must be scanned and the card repositioned at least a number of times equivalent to the number of rows on the card. It should be obvious that reading out digital data into a record medium in the above described manner involves a large amount of electronic activity and consequently it is highly desirable that the circuits and apparatus employed not only operate at high speed but are preferably self-checking to ensure that the operations are properly carried out.

Accordingly, one of the objects of this invention is to provide simplified fast-acting apparatus comprising bistable magnetic cores for performing the conversion of the electrical data and the selection of the columns of a record medium on which the data are to be recorded.

Another object of this invention is to provide circuits for reliably checking different aspects of the apparatus performing the converting and punching operations of the present invention.

Still another object of this invention is to provide fast-acting circuit arrangements for converting data signals and providing signals for punching out record mediums, which circuit arrangements are especially suitable for providing a check of the reliability of the performance of these operations.

This invention will be more clearly understood from the following detailed description of a preferred embodiment and the accompanying drawings, wherein:

Figs. 1, 2, and 3, taken together, constitute a schematic diagram of apparatus and circuits exemplifying the invention;

Fig. 4 is a table of codes representing a set of characters such as may be used to represent the data;

Fig. 5 is a hysteresis diagram used in explaining the operation of a typical magnetic core;

Figure 1:
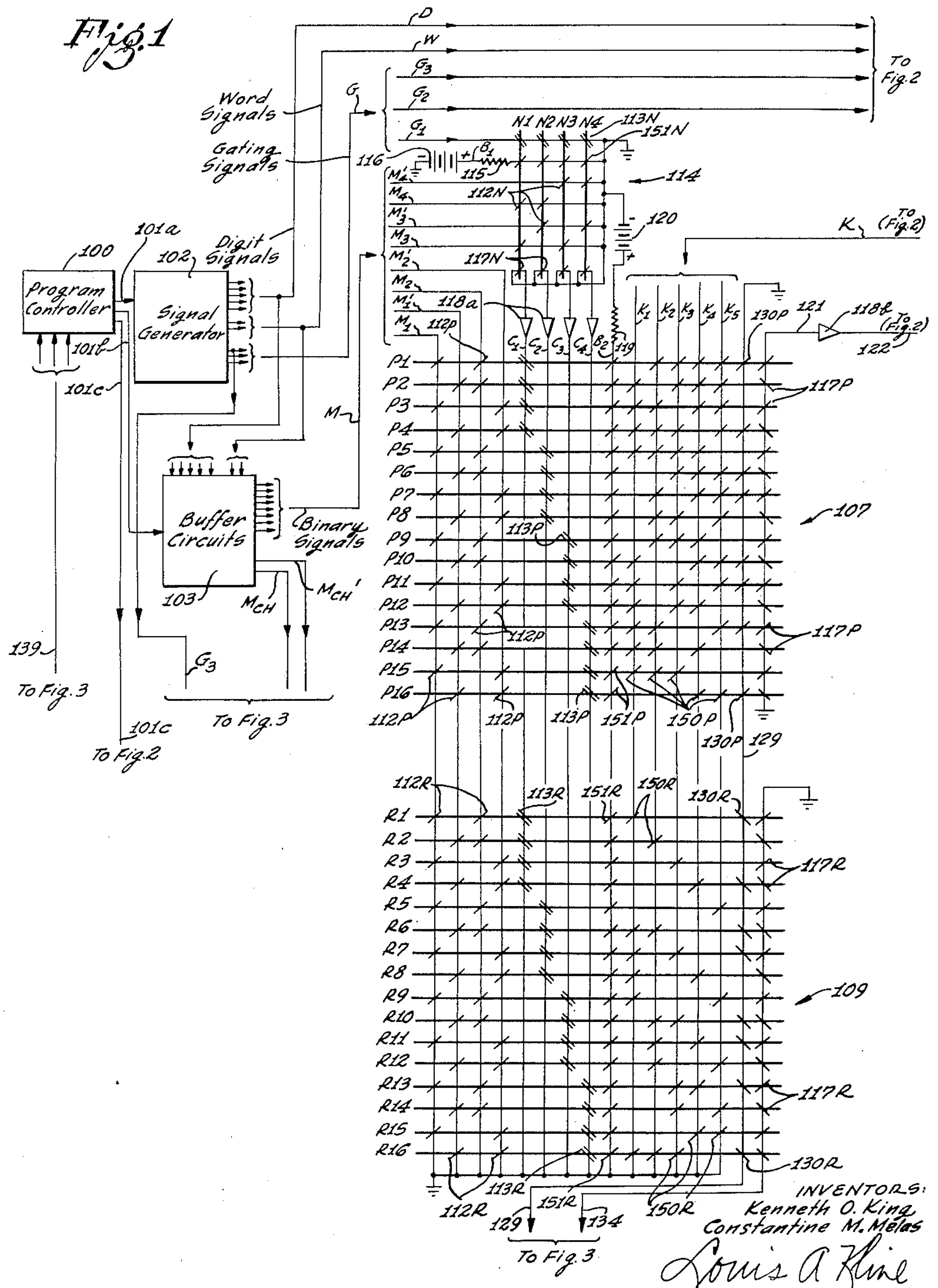
Figure 2:
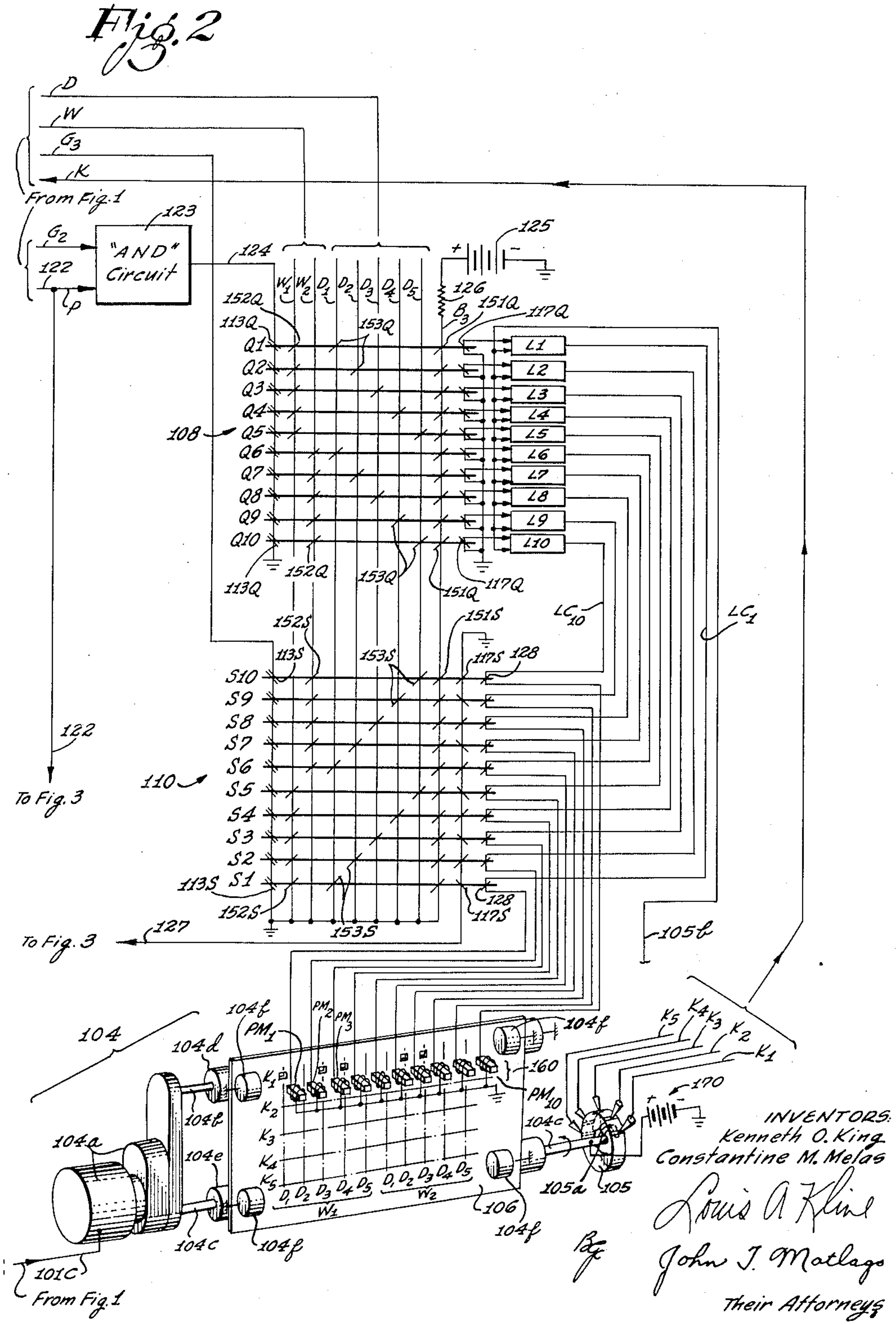

In Fig. 1 a program controller 100 controls a signal generator 102, buffer circuits 103, and a card handling mechanism 104 (Fig. 2), as indicated schematically by lines 101*a*, 101*b*, and 101*c*, respectively. Generator 102 supplies word, digit, and gating signals on W, D, and G conductors, respectively, as indicated. Buffer circuits 103 are assumed to have stored therein data which has been abstracted from information-carrying media, such as for example paper or magnetic tapes. The data stored in the buffer circuits 103 in the form of binary signals representing characters are to be converted into signals useful for punching the data in coded form on card 106 (Fig. 2). An exemplary set of sixteen characters is shown in the first column of the table of Fig. 4. This set includes the Arabic numerals 0 to 9, the letters A, B, and C, the dollar sign ($), the period (.), and the comma (,). In the following description it will be shown that any number of characters may be used. The number sixteen was chosen as sufficient and convenient for purposes of illustration.

As shown in Fig. 2, card handling mechanism 104 comprises a motor and gear-box assembly 104*a* which causes shafts 104*b* and 104*c* to rotate. Shaft 104*b* turns a roller 104*d*, and shaft 104*c* turns a roller 104*e*. Card 106 rides on rollers 104*d* and 104*e* and is held firmly thereagainst by four freely running rollers 104*f*. When actuated by a suitable signal on line 101*c* from program controller 100, motor and gear-box assembly 104*a* incrementally rotates shafts 104*b* and 104*c* so as to move card 106 upwards as desired. Shaft 104*c* extends beyond the end of roller 104*e* and actuates a rotary switch 105. Contact arm 105*a* of rotary switch 105 is connected to the positive terminal of a battery 170, the negative terminal of which is grounded. The card 106 is so positioned in the handling mechanism 104 and its movement so controlled that the appropriate one of the row indicating conductors $K_1$ through $K_5$ is connected by the rotary switch 105 to the battery 170 dependent on the location of the punching magnets $PM_1$–$PM_{10}$ relative to the rows of the card.

Figure 8:
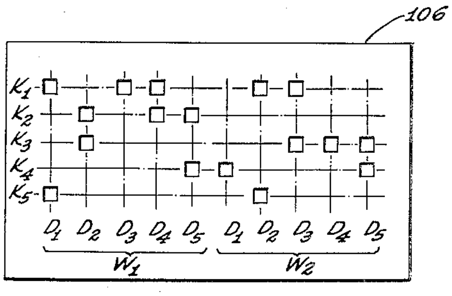
Fig. 8 shows a card punched by the apparatus and circuits of the present invention.

The card 106 shown in Fig 2 is merely exemplary and does not necessarily illustrate an existing card, but, again, is sufficient and convenient for purposes of illustration. As also shown in Fig. 8, card 106 provides ten vertical colums of punching positions arranged in five horizontal rows.

For convenience, the ten columns on card 106 are divided into two groups, or "words," of five columns each. These "words" are designated as $W_1$ and $W_2$. The five columns of each word are designated as "digits," $D_1$ to $D_5$. Each column can thus be identified by a combination W and D signal. Thus the first column is identified by $W_1D_1$, the second by $W_1D_2$, and so on to $W_1D_5$ for the fifth column. The sixth column is identified by $W_2D_1$, the seventh by $W_2D_2$, and so on to $W_2D_5$ for the last column. In Fig. 8 the card 106 is shown as having been punched, the punches being indicated by small squares. The first column is shown punched in the first and the fifth rows. The second column is shown punched in the second and the third rows. The remaining columns are punched as indicated. Each column represents a character, according to the "card code" column of Fig. 4. Thus the punches in the first column of card 106 represents numeral 8. The second column of card 106 represents numeral 9, and so on. The whole card carries the information 8905A 3862C. An actual card used in the art may have many more words and digits, for instance eight words of ten digits each, representing 80 columns. Such a card could therefore have 80 characters punched on it. Moreover, such a card may have as many as twelve horizontal rows for punching, instead of the five illustrated herein. However, the following description will show how information may be transferred to any similar punched card, regardless of the number of rows and columns of punching positions on the card.

Referring to Figs. 1 and 2, in accordance with the purposes of the invention, there is provided a first main or P array 107 comprising bistable magnetic elements, and a second main or Q array 108 comprising similar bistable magnetic elements. For checking purposes there are also provided third or fourth R and S arrays 109 and 110, respectively, comprising similar bistable magnetic elements. Checking circuits 111, Fig. 3, are also provided.

Main arrays 107 and 108 each comprise a number of bistable magnetic elements, such as magnetic cores, which are well known in the art. Main array 107 preferably includes the same number of cores as there are different characters, i.e., sixteen in the illustrative example herein. Main array 108 preferably includes the same number of cores as there are columns on card 106, i.e., ten in this illustrative example. The sixteen cores of main array 107 are designated P1 to P16, respectively, and the ten cores of the main array 108 are designated Q1 to Q10, respectively.

The cores of main array 107 have magnetically coupled thereto a number of windings indicated by either single oblique strokes or double oblique strokes. Windings represented by double oblique strokes have twice the number of ampere-turns as those represented by single oblique strokes. The slope of the strokes indicates the relative direction of the magnetizing force H produced when the windings are energized. See Fig. 5 of the drawings, which shows the hysteresis loop of a typical magnetic core. The magnetizing force H is plotted horizontally and the induced magnetic flux $\phi$ is plotted vertically. One of the windings on a given core indicated by a single oblique stroke of positive slope, when energized, will produce a unit of magnetizing force $H_1$, inducing flux $\phi_1$ in the core. Two or more such windings on a given core, when energized, will produce magnetizing forces $H_2$, $H_3$, etc., inducing fluxes $\phi_2$, $\phi_3$, etc. The incremental changes in flux from $\phi_0$ to $\phi_1$, from $\phi_1$ to $\phi_2$, from $\phi_2$ to $\phi_3$, etc., are designated as $\Delta\phi_1$, $\Delta\phi_2$, $\Delta\phi_3$, etc. in Fig. 5. Inducing these small changes $\Delta\phi$ of flux in the cores constitute what is known as the shuttling effect (when the flux changes by one or more of these increments, the core is said to shuttle).

The magnetizing force $H_1$ can be considered as a steady bias force on a core which must be overcome by an appropriate driving pulse to turn over the core to its opposite state denoted as $-\phi_1$. The magnetizing forces $H_2$, $H_3$, etc., if present on a core, inhibit the core from turning over even if the driving pulse is applied. Thus, in the absence of bias forces, other than the steady bias, such as $H_1$, the application of a driving pulse to a core causes a reversal of direction of flux, from $\phi_1$ to $-\phi_1$, as indicated by branch "*a*" of the hysteresis loop in Fig. 5. This large change of flux of a core generates an E.M.F. in any windings on the core; such an E.M.F. in a particular winding can be used as an output signal. Shuttling also produces small signals in any windings on the core, but these are generally unwanted and are, therefore, classed as noise. It is desirable to keep shuttling to a minimum so as to have a large ratio of signal to noise in an array of cores. It is, therefore, desirable to have a core well biased or inhibited unless it is desired to switch the core, that is, to reverse the flux. Since $\Delta\phi_1 > \Delta\phi_2 > \Delta\phi_3 > \ldots$, the greater the bias on a given core, the less will be the shuttling effect for a given change of magnetizing force.

In Fig. 4, the "buffer code" column of the table is shown subdivided into five sub-columns indicating signals $M_{CH}$ and $M_1$ to $M_4$. Sub-column $M_{CH}$ represents signals used for purposes of checking, and will be discussed later. Columns $M_1$ to $M_4$ represent a binary signal code for the sixteen different characters shown in the first column for example, numeral 7 is represented by 0111, letter B is represented by 1011, and so on.

Buffer circuits 103 (Fig. 1) generate electrical signals representing the binary values $M_1$ to $M_4$, and also generate electrical signals representative of the inverses of $M_1$ to $M_4$, these inverses being indicated by $M_1'$ to $M_4'$. These binary signals representing one of the characters shown in Fig. 4 are simultaneously fed out of the buffer circuits 103 by way of eight conductors designated, for convenience, $M_1$ to $M_4$ and $M_1'$ to $M_4'$, the designations indicating the signals carried. Conductors $M_1$, $M_1'$, $M_2$, and $M_2'$ are fed directly into the P array and coupled to the cores thereof by windings 112P as indicated by single oblique strokes of positive slope. Conductors $M_3$, $M_3'$, $M_4$, and $M_4'$ are not fed directly into the P array, but are instead fed into an auxiliary N array 114, comprising four bistable magnetic cores, N1 to N4, and the conductors are coupled to the cores thereof by windings 112N indicated by single oblique strokes of positive slope.

Conductors $M_1$, $M_1'$, $M_2$, and $M_2'$ are coupled to the cores of the P array according to the 0's of the binary code shown in Fig. 4. For instance, conductor $M_1$ is coupled to each of the odd-numbered cores P1 to P15, and conductor $M_1'$ is coupled to each of the even-numbered cores P2 to P16. The coupling of conductors $M_3$, $M_3'$, $M_4$, and $M_4'$ to the cores of the N array will be more easily understood from the following discussion of the operation of the N array. It will be seen from Fig. 1 that, in addition to the M conductors, the cores of the N array are wound by a steady bias conductor $B_1$ and a driving or switching conductor $G_1$. Steady bias conductor $B_1$ is coupled by windings 151N on all cores N1 to N4, as indicated by single oblique strokes of positive slope, and is connected between ground and a limiting resistor 115 in series with a bias battery 116. Driving conductor $G_1$ is coupled by windings 113N to all four cores N1 to N4, as indicated by double oblique strokes of negative slope, and is connected between ground and signal generator 102. On each core N1 to N4 is wound an output winding 117N, one end of which is grounded and the other end of which is connected to an amplifier **118*a*. There are thus four amplifiers 118*a* and they are preferably of the type known as univibrators or one-shot multivibrators. Each amplifier 118*a* feeds its output into the P array by way of a respective driving conductor $C_1$ to $C_4$. Output signals from the N array, which are generated in the output windings 117N of cores N1 to N4**, thus cause input signals to appear in the P array on driving conductors $C_1$ to $C_4$, respectively.

The coupling of the four M conductors $M_3$, $M_3'$, $M_4$, and $M_4'$ to the N array and the coupling of the resulting driving conductors $C_1$ to $C_4$ to the P array are such that, when these four M conductors are energized, only a portion of the P cores have driving currents applied thereto as determined by which of the cores correspond to characters whose binary codes have similar binary digits in the $M_3$ and $M_4$ digit positions, as shown in Fig. 4. To accomplish this mode of selectively driving the groups of cores in the P array, core N1 has conductors $M_3$ and $M_4$ wound thereon, core N2 has conductors $M_3'$ and $M_4$ wound thereon, core N3 has conductors $M_3$ and $M_4'$ wound thereon, and core N4 has conductors $M_3'$ and $M_4'$ wound thereon. These M conductors are so coupled by means of windings 151N indicated by strokes of positive slopes. Conductor $C_1$, on which an output signal is induced when core N1 is turned over, is wound on cores P1 and P4; conductor $C_2$, on which an output signal is induced when core N2 is turned over, is wound on cores P5 to P8; conductor $C_3$, on which an output signal is induced when core N3 is turned over, is wound on cores P9 to P12; and conductor $C_4$, on which an output signal is induced when core N4 is turned over, is wound on cores P13 to P16. The C conductors are so coupled by means of windings 113P indicated by strokes of negative slope. Now consider what happens in the N and the P arrays when binary signals representing a given character are read out of buffer circuits 103. Assume that the information 8905A 3862C is stored in buffer circuits 103 and that numeral 8 is the first to be read out of the buffer circuits in the pulse time interval $W_1D_1$, as indicated by the waveforms in Fig. 6. Signal generator 102 will actuate buffer circuits 103 by way of the $W_1$ and $D_1$ conductors so that the M windings will become energized according to the binary code for numeral 8 shown in Fig. 4. That is to say, conductors $M_1$, $M_2$, $M_3$, and $M_4'$ will have no current pulses thereon, and conductors $M_1'$, $M_2'$, $M_3'$, and $M_4$ will have current pulses thereon. At the same time, driving conductor $G_1$ will have current in it, supplied by signal generator 102. On core N1 the $G_1$, $B_1$, and $M_4$ conductors will be energized. The resulting magnetic force on core N1 will therefore be 0, since the flux induced by the windings of the $B_1$ and the $M_4$ conductors will cancel the flux produced by the windings of the $G_1$ conductor. On core N2 the windings connected to the $G_1$, $B_1$, $M_4$, and $M_3'$ conductors will be energized, and the net magnetic force thereon will be $H_1$. On core N4 the windings connected to the $G_1$, $B_1$, and $M_3'$ conductors have current in them, and the net magnetic force is $H_1$. It should thus be obvious that cores N1, N2, and N4 do not switch on the reading out of numeral 8 from buffer circuit 103, and conductors $C_1$, $C_2$, and $C_4$ do not become energized. On core N3, however, as shown by the waveforms in Fig. 7, only the windings connected to the $G_1$ and the $B_1$ conductors will be energized, and the net magnetic force on the core will be $-H_2$ with the result that the flux therein will be reversed. Core N3 is therefore momentarily switched, and this produces an output signal in the output winding 117N thereof. This output signal is illustrated as signal $p_1$ in Fig. 7 and energizes the amplifier 118*a* which is fed by this output winding, with the result that conductor $C_3$ becomes energized, as also illustrated in Fig. 7. Upon removal of the energizing pulse on conductor $G_1$, the bias $B_1$ switches the core N3 back to its original condition producing an additional signal $p_2$ which has no effect on the amplifier 118*a*.

In the P array, each core is provided with a steady bias by means of a winding connected to conductor $B_2$, as in the N array. Conductor $B_2$ is coupled to each of the P cores by windings 151P, as indicated by oblique strokes of positive slope, and is connected between ground and a limiting resistor 119 in series with a bias battery 120. Considering the $B_2$ conductor, the $C_3$ conductor, and the M conductors, it can be seen that in response to coded signals from buffer circuits 103 representing numeral 8, the net magnetic forces produced by energizing of the connected windings on cores P9, P10, P11, and P12 are respectively $-H_1$, 0, 0, and $H_1$. Therefore, in the absence of other inhibiting magnetizing forces, the reading out of numeral 8 from buffer circuits 103 will cause core P9 to switch.

The possible selection of one of the P cores for switching in response to the reading out of a character from the buffer circuits 103 is further determined by a number of inhibiting K windings 150P in the P array. Five row conductors $K_1$ to $K_5$ are coupled to the cores of the P array, according to the complement of the code shown in Fig. 4 in the column headed "card code" (see also the last column in Fig. 4). Conductor $K_1$, for example, is coupled to those cores of the P array which are not marked with an "X" in the "card code" column under $K_1$. Similarly, conductors $K_2$ to $K_5$ are coupled to those cores of the P array which are not marked with an "X" under columns $K_2$ to $K_5$, respectively. In Fig. 1 the windings 150P are indicated by single oblique strokes of positive slope.

The position of card 106 in the handling mechanism 104 determines which K conductor will be energized. If row $K_1$ is being punched, then conductor $K_1$ will be energized by contact arm 105*a* of rotary switch 105. If row $K_2$ is being punched then conductor $K_2$ will be energized, and so on.

At any given time, only one K conductor will have current in it. Therefore, core P9 will be able to switch, in the reading out of numeral 8 from buffer circuit 103, if either conductor $K_1$ or conductor $K_5$ is energized, but not if conductor $K_2$ or $K_3$ or $K_4$ is energized.

The windings connected to conductors $M_1$, $M_1'$, $M_2$, and $M_2'$, and $K_1$ to $K_5$ are bias or inhibting windings, and the windings connected to conductors $C_1$, $C_2$, $C_3$, and $C_4$ are called switching or driving windings. On each reading out of a character from buffer circuits 103, one of the switching conductors $C_1$ to $C_4$ is energized thus causing one of the P cores to switch, the particular P core being that one whose windings connected to conductors $M_1$, $M_1'$, $M_2$, $M_2'$, and $K_1$ to $K_5$ are not receiving any inhibiting current.

An output conductor 121 is coupled to each core of the P array, by windings 117P, indicated by oblique strokes. Windings 117P function as output windings and are wound alternately in opposite senses as indicated by strokes of opposite slop so as to reduce the cumulative shuttling effect. When a P core switches, an output pulse will appear on conductor 121. Since conductor 121 is connected between ground and an amplifier 118*b*, which is similar to amplifiers 118*a*, an output pulse from the P array will be fed into amplifier 118*b*.

The foregoing completes the description of the N and the P arrays, except for a parity conductor 129 which is coupled to certain ones of the cores of the P array, by windings 130P indicated by oblique strokes of positive slope. Conductor 129 is for checking purposes, and will be described in detail later.

It should be understood that provision of the N array is not necessary for the successful application of the principles of the present invention; however, it does constitute a useful and highly desirable feature. It can be seen from the foregoing description how the shuttling effect is reduced in the P array by use of the N array. If the N array were not used it would be necessary to feed conductors $M_3$, $M_3'$, $M_4$, and $M_4'$ into the P array directly, coupling them to the P cores according to the buffer code (Fig. 4, column 2). Each core of the P array would then require the conductor $G_1$ to be coupled thereto. The result would be that all sixteen P cores would be driven by the gating signal $G_1$, whereas, by use of the N array, only four P cores are driven. It is therefore an obvious advantage to feed half of the binary signals into the P array indirectly, by means of the N array. This principle applies also if there are more than sixteen characters and, therefore, more than sixteen cores. If a set of say sixty-four characters were to be employed, it would be necessary to provide sixty-four cores in the P array (and, of course, sixty-four also in the R array), and six binary digits ($M_1$ to $M_6$) instead of the present four ($M_1$ to $M_4$) would be needed to code the characters. (It would still be necessary to provide a seventh binary digit $M_{CH}$ for purposes of checking.) With sixty-four characters and sixty-four cores, it should then be desirable to provide eight ($2^3$) cores in the N array, into which the six binary signals $M_4$ to $M_6$ and $M_4'$ to $M_6'$ would be fed. The six remaining binary signals $M_1$ to $M_3$ and $M_1'$ to $M_3'$ would be fed directly into the P array. Eight C conductors, $C_1$ to $C_8$, each one of which would be coupled to a group of eight P cores, would also be provided. Therefore, of sixty-four cores, only eight would be driven by the gating signal by using the N array, whereas, without the N array, all sixty-four cores would be driven. In the latter case, it is easily seen that the total shuttling effect would be much greater than in the former case, with sixty-four cores being driven as compared to eight.

Figure 9:
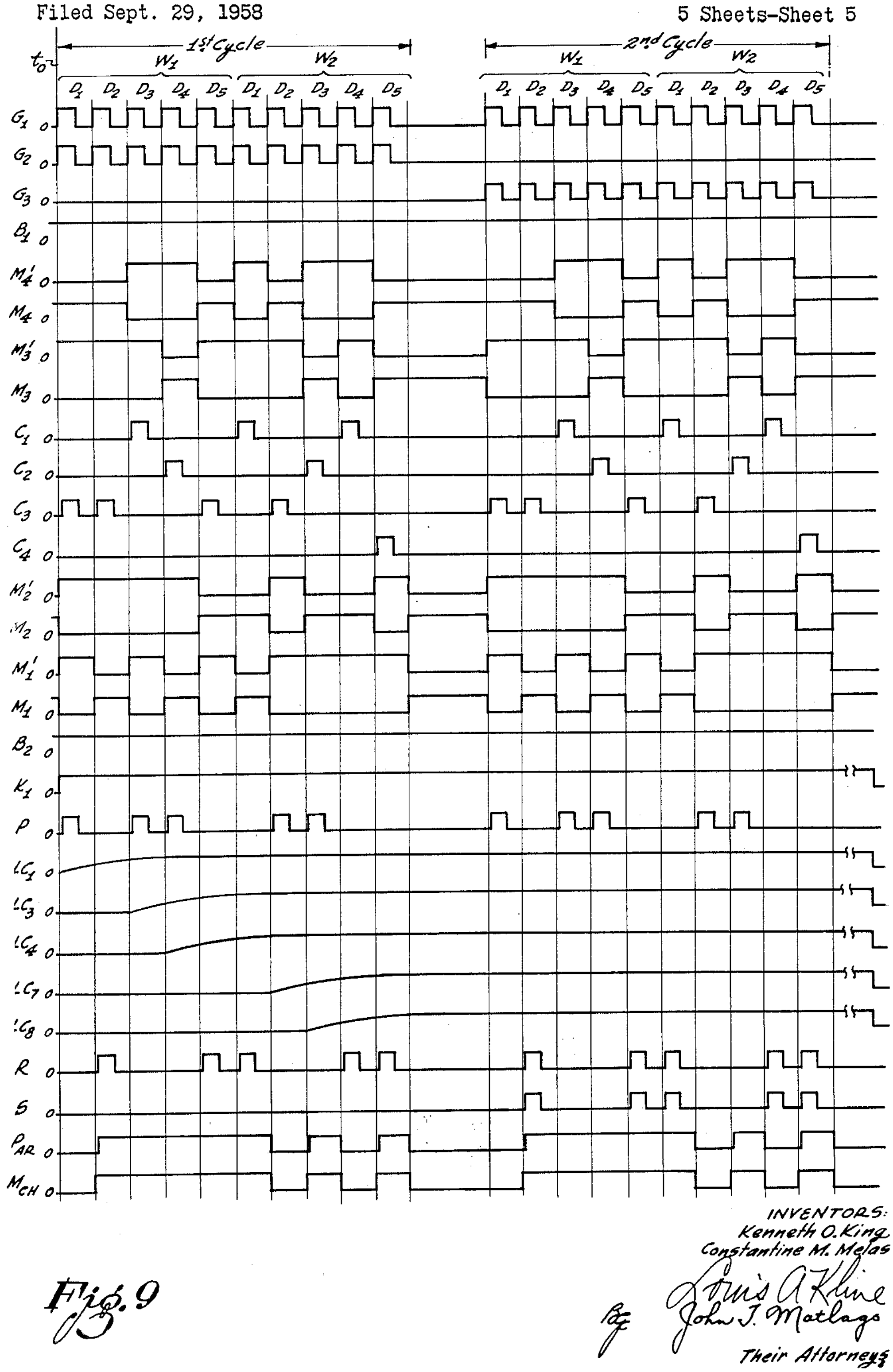
Fig. 9 shows further waveforms for explaining the operation of the circuits.

The description of the operation of the N and the P arrays can now be completed with reference to Fig. 9, which shows further signals appearing on various conductors as plots of current against time. The vertical line $t_0$ indicates the beginning of the reading out of numeral 8 from buffer circuit 103. This reading out of numeral 8 occupies the time interval $W_1D_1$ which, in the apparatus of the present invention, is about 10 $\mu$sec. The signals $G_1$, $M_1$ to $M_4$, $M_1'$ to $M_4'$, and $C_1$ to $C_4$ are as shown in Fig. 9 in the time interval $W_1D_1$. The output signal from the P array on conductor 121 (Fig. 7) is shown as consisting of a first negative-going pulse $p_1$ followed by a second positive-going pulse $p_2$. As previously mentioned, pulse $p_2$ is generated when the signal on conductor $C_3$ returns to the value zero, allowing the steady bias on core P9 to return the flux to the value $\phi_1$; i.e., pulse $p_2$ is generated when core P9 is "reset". Amplifier **118*b* is designed to be actuated only by pulse $p_1$. The output of amplifier 118*b* is fed by way of a conductor 122 to an "and" circuit 123** (Fig. 2).

The "and" circuit 123 is well known in the art. The inputs to "and" circuit 123 comprise gating signals $G_2$ and the P signals appearing on conductor 122. The output of "and" circuit 123 is fed into the Q array 108 by way of a driving conductor 124 which is coupled to the cores of the Q array by windings 113Q, as indicated by double oblique strokes of negative slope, and then grounded.

Figure 6:
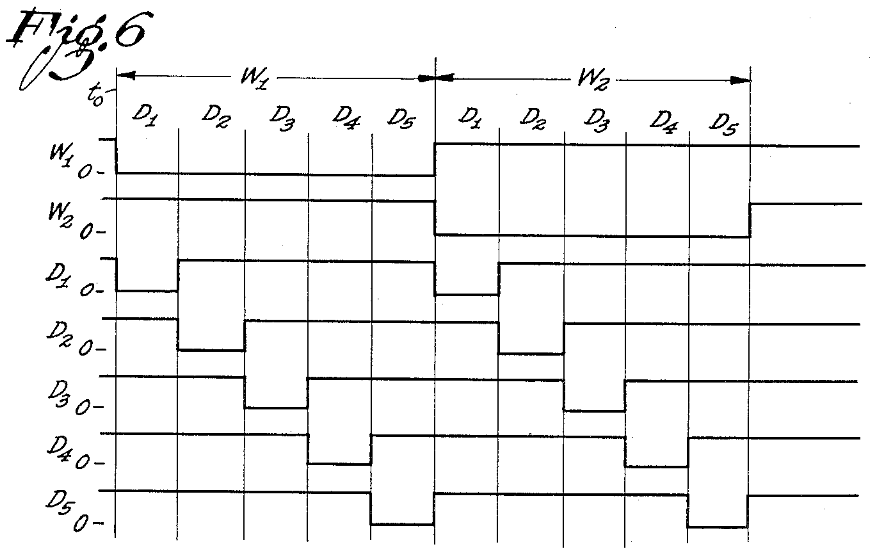
Fig. 6 shows waveforms representing word and digit signals used for defining the time intervals during which signals representing the characters are sensed.
Figure 7:
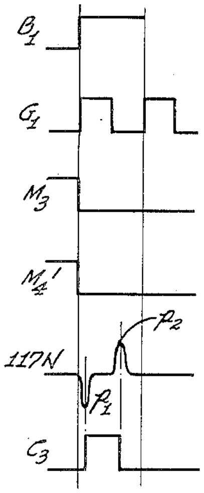
Fig. 7 shows waveforms illustrating the operation of the bistable magnetic cores of the N array.

The W and the D signals are shown in Fig. 6. These signals, in combination, denote the digit position of the word currently being read out of the buffer circuits 103 into the punched card 106. Thus a zero current condition on a W and a D conductor describes the current digit position. These W and D signals are fed into the Q array on the conductors $W_1$, $W_2$, and $D_1$ to $D_5$. Their action is further discussed below. Conductor $W_1$ is coupled to cores Q1 to Q5 and conductor $W_2$ is coupled to cores Q6 to Q10, each by a winding 152Q indicated by a single oblique stroke of positive slope. Conductor $D_1$ is coupled to cores Q1 and Q6, conductor $D_2$ to cores Q2 and Q7, conductor $D_3$ to cores Q3 and Q8, conductor $D_4$ to cores Q4 and Q9, and conductor $D_5$ to cores Q5 and Q10, each by a winding 153Q indicated by a single oblique stroke of positive slope. The W and the D conductors are then grounded. A steady bias conductor $B_3$ is coupled to each of the Q cores by a winding 151Q indicated by a single oblique stroke of positive slope. Bias conductor $B_3$ is connected between ground, on one hand, and a limiting resistor 126 and a bias battery 125, on the other hand. On each Q core is wound an output winding 117Q connected between ground and an individual latching circuit L1 to L10. Cores Q1 to Q10 thus feed their output signals into latching circuits L1 to L10, respectively.

The foregoing completes the description of the Q array. The operation of the Q array can be understood with reference to Figs. 6 and 9, under time interval $W_1D_1$ of the first cycle. The P output signal from the P array coincides with gating signal $G_2$ resulting in an output from "and" circuit 123 (the output is not shown in Fig. 9) and the energizing of the driving windings 113Q on each of the Q cores. The currents in conductors $W_1$ and $D_1$ are cut off in this interval, as indicated in Fig. 6, resulting in core Q1 being switched and cores Q2 and Q10 being merely shuttled. Latching circuit L1 is triggered by the output signal appearing on output winding 117Q of core Q1. The latching circuits are designed so that when one is triggered the others are not affected by the shuttling.

Latching circuits L1 to L10 are preferably of the bistable type which, after being triggered, continue to conduct current until switched off, or "unlatched." The outputs from the latching circuits L1 to L10 are fed by way of conductors $LC_1$ to $LC_{10}$, respectively to a punch mechanism 160 comprising ten electromagnetically operated punch magnets $PM_1$ to $PM_{10}$. The punch magnets are merely indicated schematically, such mechanisms being well known in the art, and are shown in position to punch the first row of card 106. Therefore, when latching circuit $LC_1$ is triggered by the output signal from core Q1, punch magnet $PM_1$ is actuated for punching the first row of the first column of card 106.

During time interval $W_1D_2$, the next character is read out of buffer circuits 103. This is numeral 9, and the currents in the M conductors are shown in Fig. 9 in accordance with the buffer code (Fig. 4) for this character. At the same time conductor $G_1$ is energized. As a result core N3 is switched providing a driving current on conductor $C_3$ coupled to cores P9 to P12 in the P array. Cores P9, P11, and P12 are prevented from being switched because of the inhibiting currents in conductors $M_1$ and $M_2'$. Further, because of the current in conductor $K_1$, core P10 cannot switch. Thus, as shown in Fig. 9, there is no P output signal on conductor 121 from the P array during interval $W_1D_2$. Consequently there is no output from "and" circuit 123 and none from the Q array. Therefore latching circuit L2 is not triggered and punch magnet $PM_2$ is not actuated.

In time interval $W_1D_3$, the third character stored in buffer circuits 103 is read out. This is numeral 0. Core P1 is accordingly switched in the P array, since this core is not wound by a $K_1$ conductor and this core is not inhibited by currents in the M conductors. Thus, as shown in Fig. 9, there is a P output signal on conductor 121 from the P array during interval $W_1D_3$. Conductor 124 leading out of "and" circuit 123 is accordingly energized and, since the current in conductor $D_3$ has been cut off, the flux is reversed in core Q3, and latching circuit L3 is triggered. Punch magnet $PM_3$ is therefore actuated for punching card 106 in the third column of the first row.

The foregoing process is repeated for each pulse period of two word periods $W_1$ and $W_2$, i.e., a total of ten time intervals $W_1D_1$ to $W_2D_5$, in the present embodiment. The result is that the first row of card 106 is punched in columns $W_1D_1$, $W_1D_3$, $W_1D_4$, $W_2D_2$, and $W_2D_3$. The process occupies about 100 microseconds. At the end of time interval $W_2D_5$, program controller 100 remains quiescent for a first delay interval of about 5 milliseconds to permit the currents in the punch magnets to become fully established.

The currents in the selected punch magnets $PM_1$–$PM_{10}$ flow for a long time compared to the time required to read out and convert the information stored in buffer circuits 103. Advantage is therefore taken of this long punching time to read out the information in the buffer circuits 103 a second time for the purpose of checking the operation of the apparatus. As mentioned above, R array 109, S array 110, and checking circuits 111 are provided for this purpose.

The R array is smiliar to the P array and comprises the same number sixteen of magnetic cores, numbered $R_1$ to $R_{16}$, corresponding to cores P1 to P16, respectively, of the P array. The inhibiting conductors $M_1$, $M_1'$, $M_2$, $M_2'$, the switching conductors $C_1$ to $C_4$, and the steady bias conductor $B_2$ are coupled to the R cores, by windings 112R, 113R, and 151R, respectively, exactly as they are in the P array. The K conductors, however, are coupled to the R cores by windings 150R, as indicated by oblique strokes of positive slope, directly according to the "card code" shown in Fig. 4. Conductor $K_1$, for example, is coupled to the R cores indicated by X's in the $K_1$ column of Fig. 4. An output conductor 134, connnected between ground and checking circuits 111, is coupled to the R array by a plurality of windings 117R, wound in opposite sense on alternate cores of the R array as indicated by oblique strokes of positive and negative slopes.

The operation of the R array is the same as that of the P array except that when a core in one of these arrays switches, the corresponding core in the other array will not switch, because of the complementary method of winding the K conductors. It should now be clear, as also shown in Fig. 9, that each time a character is read out of buffer circuits 103, there must be an output signal on either conductor 121 leading out of the P array or conductor 134 leading out of the R array, if the apparatus is functioning properly.

The S array 110 is similar to Q array 108, comprising the same number ten of magnetic cores, numbered S1 to S10 and corresponding to cores Q1 to Q10, respectively, of the Q array. The S array is wired in part similarly to the Q array in that the W and D conductors and the steady bias conductor $B_3$ are coupled to the S cores by windings 152S, 153S, and 151S, respectively, the same as in the Q array. However, the cores of the S array are driven by current pulses on conductor $G_3$ which is coupled to each of the cores as indicated by winding 113S, and then grounded. An output conductor 127, connected between ground and checking circuits 111, is coupled to the S array by a plurality of windings 117S, one on each core. In addition, each of the conductors $LC_1$ to $LC_{10}$ is coupled to a respective one of the cores S1 to S10 by windings 128, as indicated by single oblique strokes of positive slope. The current actuating the punch magnets thereby provide extra magnetic biasing forces on the S cores. Cores S1, S3, S4, S7, and S8 thus have additional bias provided by their windings 128 as a result of latching circuits L1, L3, L4, L7, and L8 being set during the punching of the first row of core 106.

It will be seen from Fig. 9 that driving conductor $G_3$ is not energized during the first reading out of information from buffer circuits 103, i.e., the first cycle of operation. Therefore, there will be no output from the S array during these time intervals. However, during the second cycle when the operation of the apparatus is checked, driving conductor $G_3$ is energized, i.e., pulsed during each time interval as shown in Fig. 9. The W and the D conductors are energized in the same sequence during the second cycle as they were during the first cycle. The cores S2, S5, S6, S9, and S10 will, therefore, switch during time intervals $W_1D_2$, $W_1D_5$, $W_2D_1$, $W_2D_4$, and $W_2D_5$ of the second cycle, respectively, producing output signals on conductor 127. The cores S1, S3, S4, S7, and S8 are prevented from switching by the energizing of the respective windings 128.

During the second cycle, conductor $G_2$ is not energized, as shown in Fig. 9, and therefore the Q array will not be actuated. The P and the R arrays, however, are energized as they were in the first cycle, and therefore produce the same outputs during the second cycle as they did during the first cycle. The outputs from the P and the R arrays are utilized in checking circuits 111 during the second cycle.

Parity conductor 129, mentioned above, will now be described more fully and its function explained. Parity conductor 129 is connected between ground and checking circuits 111, and is coupled to a number of cores in the P array by windings 130P, and to a number of cores in the R array by windings 130R. The parity windings are coupled according to the 1's of the binary code for $M_{CH}$ (see Fig. 4) in each array. That is, each of cores P1, P4, P6, P7, P10, P11, P13, and P16 has a parity winding 130P coupled thereto. The corresponding R cores are wound in the opposite sense to reduce the shuttling effect. In the "buffer code" column of Fig. 4, the presence or the absence of a 1 under $M_{CH}$ is determined by the presence or the absence, respectively, of an even number of 1's in the other four columns $M_1$ to $M_4$, i.e., by the plan to provide an odd number of 1's in each row. The parity windings 130P and 130R will have signals generated in them when the cores to which they are coupled have their flux reversed, and therefore function similarly to the output windings 117P and 117R. Parity conductor 129 therefore feeds output signals into checking circuits 111 when signals are induced in the parity windings.

Checking circuits 111 of Fig. 3 will now be described. These circuits comprise three similar sections. The first section comprises a comparison network $CN_1$ and an error indicator $E_1$, and compares the binary signals $M_{CH}$ and $M_{CH}'$ with the parity signals $P_{AR}$ and $P_{AR}'$. The second section comprises a similar comparison network $CN_2$ and an error indicator $E_2$, and compares the outputs of the P and the R arrays. The third section comprises a similar comparison network $CN_3$ and an error indicator $E_3$, and compares the outputs of the P and the S arrays. Checking circuits 111 are controlled by signal $G_3$ so as to be inoperative during the first cycle and operative during the second cycle, as indicated by the waveforms in Fig. 9.

Parity conductor 129 feeds the parity signals into an amplifier **118*c*, similar to amplifier 118*b*. The output of amplifier 118*c* constitutes the parity signal $P_{AR}$, and is fed into comparison network $CN_1$ on conductor 129*a*, and also into an inverter 131*a*. The output lead 129*b* of inverter 131*a* feeds the inverse parity signal $P_{AR}'$ into comparison network $CN_1$. Inverter 131*a* is preferably such that its output lead 129*b* is normally at a voltage representative of a binary 1, and such that when it is actuated by a parity signal $P_{AR}$ the output lead 129*b* assumes a voltage representative of a binary zero for the duration of the signal. The binary signals $M_{CH}$ and $M_{CH}'$ are also fed into comparison network $CN_1$ directly from buffer circuits 103**. There are thus the gating signal $G_3$ and the four signals, $M_{CH}$, $M_{CH}'$, $P_{AR}$, and $P_{AR}'$, fed into and compared by comparison logical network $CN_1$ in such a way, as is well known in the art, that an error signal $e_1$ is generated by comparison network $CN_1$ whenever the following Boolean algebraic equation is satisfied:

$$e_1=(M_{CH}P_{AR}'+M_{CH}'P_{AR})G_3$$

This equation states that an error signal $e_1$ will be generated, when conductor $G_3$ is energized, if the signal $M_{CH}$ and the inverse of the parity signal $P_{AR}'$ have the same value, or if the signal $M_{CH}'$ and the parity signal $P_{AR}$ have the same value. If such an error signal is generated, then it will actuate error indicator $E_1$, which will thus give warning of faulty functioning of the apparatus and may actuate program controller 100, as indicated by conductors **139*a* and 139**, to take appropriate action, such as rejecting the spoiled card, for example.

Conductor 134 leads the output from the R array, into an amplifier **118*d*, similar to amplifier 118*b*. The output of amplifier 118*d* constitutes the R signal, and is fed by way of conductor 134*a* directly into a comparison logical network $CN_2$ and also into an inverter 131*b*, similar to inverter 131*a*, whose output is fed into comparison logical network $CN_2$ on conductor 134*b* as the R' signal. Conductor 122 feeds the P signal into comparison logical network $CN_2$ and also a comparison logical network $CN_3$. Conductor 122 also leads the P signals into a third inverter 131*c*, the output lead 122*a* of which has two branches, whereby the inverse of the P signals are fed into both comparison logical network $CN_2$ and comparison logical network $CN_3$. The output from the S array is fed into an amplifier 118*e* similar to amplifier 118*b*. The output of amplifier 118*e* constitutes the S signal and is fed into comparison logical network $CN_3$ on conductor 127*a* and also into an inverter 131*d* similar to inverter 131*a*. The output of inverter 131*d* constitutes the S' signal and is fed into comparison logical network $CN_3$ on conductor 127*b***.

Comparison logical network $CN_2$ therefore receives and compares the four signals R, R', P, and P' during signal $G_3$, and generates an error signal $e_2$ according to the equation: $e_2=(RP+R'P')G_3$. That is, if the outputs from the P and the R arrays are the same when gating conductor $G_3$ is energized, then error signal $e_2$ is generated, which will actuate error-indicator $E_2$ to give warning of faulty operation and to actuate program controller 100, as indicated by conductor 139*b*.

Similarly, comparison logical network $CN_3$ receives and compares the four signals P, P', S, and S' during signal $G_3$, and generates an error signal $e_3$ according to the equation: $e_3=(PS+P'S')G_3$. That is, if the outputs from the P and S arrays are the same when conductor $G_3$ is energized, then error-indicator $E_3$ will be actuated to give warning of faulty operation and to actuate program controller 100, as indicated by conductor 139*c*.

It should be clear from the above that checking circuits 111 check the operation of the conductors which carry the driving or gating signals, the binary data signals, and the word and the digit signals. They also check the operation of the remaining conductors, such as the steady bias conductors, all the cores, the "and" circuit 123, the latching circuits, and the punch magnets.

It is seen that the information stored in buffer circuits 103 has been read out twice while card 106 has been in its first position, i.e., with its first row positioned adjacent to the punch magnets. During the first reading of the buffer circuits 103 the appropriate punch magnets were energized. During the second reading of the buffer circuits 103, the apparatus was checked by checking circuits 111 while the currents were still flowing in the punch magnets. The second reading is followed by a second delay interval of about 6 or 7 milliseconds to permit the punching operations to be completed, after which program controller 100 causes handling mechanism 104 to reposition card 106 so that the second row becomes positioned for punching by the punch magnets. At the same time rotary switch 105 is actuated by shaft 104*c* so as to switch the energizing current from the conductor $K_1$ to conductor $K_2$, and unlatches latching circuits L1 to L10 by momentarily energizing line 105*b* by a suitable mechanism (not shown in drawing). The second delay interval is followed by a third delay interval of about 20 milliseconds to allow the repositioning of card 106 to be completed. This completes what may be called the first round of the punching operation, and the apparatus is now ready to punch the second row of card 106.

The second round of the punching operation is similar to the first, and results in the punching of the second row of card 106. During this round, conductor $K_2$ is energized instead of conductor $K_1$. Consequently, for the example, the second row of card 106 is punched in columns $W_1D_2$, $W_1D_4$, and $W_1D_5$. In similar third, fourth, and fifth rounds, conductors $K_3$, $K_4$, and $K_5$, respectively, are successively energized, and the remaining rows of the card are punched as indicated in Fig. 8. After the fifth round has been completed, card handling mechanism 104 will remove the punched card 106 and replace it by a new card. Buffer circuits 103 will then abstract and store therein a new set of data from the magnetic tape or other source of data,. The apparatus is then ready to convert and punch out the new set of data onto the new card.

While the form of the invention shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. A system for reading characters represented by coded signals from an electronic storage device to a record medium having a plurality of columns and a plurality of rows, the coded indications in each column representing one of said characters, said system comprising: control means for generating timing signals defining the interval during which signals representing each of said characters are read out of said storage device; a plurality of recording devices one associated with each column of said record medium; means for positioning said record medium including means for providing a signal indicative of the row of the record medium located adjacent said recording devices; converting means responsive to said row signal and said signals representing each character as read from said storage device for generating an output signal corresponding to each column of the record medium that requires a coded indication in that row to represent the respective character; and means responsive to the output signals of said converting means and the timing signals of said control means for generating signals to energize the appropriate ones of said recording devices.

2. A system for reading out a plurality of characters as expressed in a first code from an electronic storage device to a record medium capable of being punched at locations as defined by a plurality of columns and a plurality of rows, the perforations punched in each of the columns representing one of said characters in a second code, said system comprising: sequential control means for generating signals defining the order in which coded signals representing each of said characters are read out of said storage device; punching means for each column of said record medium; means for positioning said record medium including means for providing a signal indicative of the row of the record medium located to be operated upon by said punching means; converting means responsive to a signal from a selected one of said row indicating means and successive coded signals representing each of the characters as read from the storage device for generating an output signal if a perforation is required at the column location in said row of the record medium for expressing the character in the second code; column select means responsive to signals from said sequential control means and output signals generated by said converting means for generating signals to actuate selected ones of said punching means; and means for actuating said positioning means to reposition said record medium and to provide a signal out of said row indicating means representing the next row of the record medium, whereby said converting means in response to the signal representing said next row and to the successive coded signals representing each of the characters as again read from the storage device generates an output signal for application to said column select means if a perforation is required at the column location in said next row of the record medium for expressing the character in the second code.

3. A system for reading out characters expressed in a first code from an electronic storage device to a record sheet capable of being punched at locations defined by columns and rows, the perforations punched in each of the columns representing one of said characters in a second code, said system comprising: control means providing timing signals for defining code signals representing each of the characters read out of said storage device; a first array of bistable magnetic core elements, one core provided for each type of character read out of said storage device; an output conductor wound on each core of said first array on which a signal is generated whenever one of said cores is switched; a plurality of punch magnets one associated with each column of said record sheet; row indicating means for providing row code signals indicative of the row of the said record sheet located to be operated upon by said punch magnets; sets of windings included on each of said cores of said first array, said sets of windings responsive to preselected ones of the code signals representing said indicated row and preselected ones of the code signals representing said characters as read out of said storage device for successively switching cores of the first array corresponding to the characters if the second code for the characters requires a punch in the indicated row of said record sheet; and means responsive to the signals so generated on the output conductor of said first array and to said timing signals for actuating said punch magnets in timed sequence with the reading out of the characters from the storage device.

4. A system for reading out characters expressed in a first binary code from an electronic storage device to a record medium capable of being punched at locations defined by columns and rows, the perforations punched in each of the columns representing one of said characters in a second code, said system comprising: control means providing timing signals for successively defining the intervals during which code signals representing each of the characters are read out of said storage device; a first array of bistable magnetic cores, one core corresponding to each type of character read out of said storage device; an output conductor wound on the cores of said first array on which a signal is generated when one of the cores is switched; a plurality of punch magnets one associated with each column of said record medium; a plurality of latching circuits one connected to each said punch magnet; row indicating means for providing a signal indicative of the row of the record medium located adjacent said punch magnets; windings included on each of said cores of said first array, said windings responsive to code signals representing each of said characters and to the signal representing said row for switching cores of the first array corresponding to the characters read out of said storage device when the second code in the column representing the character requires a punch in the row indicated by said row signal; a second array of bistable magnetic cores, one corresponding to each column of said record medium; an individual output conductor wound on each of the cores of said second array on which a signal is generated when the respective core is switched; windings included on the cores of said second array responsive to timing signals from said control means and the signal on the output conductor of said first array of cores for individually switching the cores of said second array; and means responsive to signals on each of said output conductors of said second array for energizing said respective latching circuits to cause said punch magnets to punch the columns of the card required for that row in order to represent the characters in the second code.

5. A system for reading out a plurality of characters as expressed in a first code from an electronic storage device to a card capable of being punched at locations as defined by a plurality of columns and a plurality of rows, the perforations punched on each of the said columns representing one of said characters in a second code, said system comprising: sequential control signal means for generating signals defining the order in which coded signals representing each of said characters are read out of said storage device; row indicating means for providing a signal indicative of the row of the card being punched; a first means responsive to the signal from said row indicating means and successive coded signals representing each of the characters as read from the storage device for generating a signal if a perforation is required on that row of the column of the card for expressing the character in the second code; a second means responsive to the signal from said row indicating means and successive coded signals representing each of the characters as read from the storage device for generating an output signal if no perforation is required in that row of the column of the card for expressing the character in the second code; means responsive to the output signals of said first and second means for indicating an error signal if output signals are simultaneously generated by said first means and said second means or if neither of these means generates an output signal; and means including column select means responsive to signals from said sequential control means and output signals generated by said first means for generating signals effective in punching the column locations along the selected row of said card.

6. A system for reading out a plurality of characters as expressed in a first code from an electronic storage device to a record medium capable of being punched at locations as defined by a plurality of columns and a plurality of rows, the perforations punched on each of the columns representing one of said characters in a second code, said system comprising: sequential control signal means for generating signals defining the order in which coded signals representing each of said characters are read out of said storage device; row indicating means for providing a signal indicative of the row of the record medium being punched; a first means responsive to the signal from said row indicating means and coded signals representing the characters as read from the storage device for generating output signals if perforations are required in the column locations of that row of the record medium for expressing the characters in the second code; a second means responsive to the signal from said row indicating means and coded signals representing the characters as read from the storage device for generating output signals if no perforations are required in the column locations of that row of the record medium for expressing the characters in the second code; a first comparing means responsive to the output signals of said first and second means for indicating an error signal if neither of these means generates a signal or if both simultaneously generate a signal; third means responsive to signals from said sequential control means and output signals generated by said first means for generating signals effective in punching the column locations along the selected row of said record medium; fourth means responsive to signals from said sequential control means and output signals generated by said third means for not generating a signal if said third means generates a signal; and a second comparing means responsive to outputs from said first means and said fourth means for generating an error signal if neither said first means nor said fourth means generates a signal or if both simultaneously generate a signal.

7. A system for reading out a plurality of characters as expressed in a first code from an electronic storage device to a record sheet capable of being punched at locations as defined by a plurality of columns and a plurality of rows, the perforations punched on each of the columns representing one of said characters in a second code, said system comprising: cyclical control signal means for generating signals effective in reading out of said storage device coded signals representing all of said characters during a first and again during a second cyclical operation thereof; row indicating means for providing a signal indicative of the row of the record sheet being punched; a plurality of punch magnets one associated with each column of said record sheet; a plurality of latching circuits, each when triggered effective in energizing a respective one of said punch magnets; converting means responsive to the signal representing the row of the record sheet being punched and coded signals representing the characters as read from the storage device during the first and second cyclical operations of said control signal means for generating output signals when perforations are required in the column locations of that row of the record sheet for expressing the characters in the second code; column select means responsive to signals generated by said cyclical control means and output signals generated by said converting means during the first cyclical operation of said control signal means for generating signals effective in triggering said latching circuits; first checking means responsive to the signal representing the row of the record sheet being punched and coded signals representing each of the characters as read from the storage device during at least the second cyclical operation of said control signal means for generating output signals if no perforations are required in the column locations of that row of the record sheet for expressing the characters in the second code; a first comparing network responsive to the output signals of said converting means and said first checking means during at least said second cyclical operation of said control signal means for indicating an error signal if the output signals from these means are not different; second checking means responsive to signals from said sequential control means and output signals generated by said third means during said second cycle of said control signal means for not generating a signal if said column select means generates an output signal; and a second comparing network responsive to outputs from said converting means and said second checking means during said second cyclical operation of said control signal means for generating an error signal if the output signals from these means are not different.

8. Apparatus for reading out characters expressed in a first code as coded digit signals at the output of a storage device, and recording the characters in a different code on a record medium as represented by recordings in rows and columns of the record medium, comprising: a plurality of recording members, one associated with each column of the record medium; record medium feeding mechanism for positioning the record medium row-by-row relative to the recording members; row indicating apparatus for producing electric row signals indicative of the row of the record medium currently in the recording position; timing means for producing timing signals defining the time period during which a character is currently at the output of the storage device and identifying the columns of the record medium; conversion means responsive to the coded digit and row signals and adapted to generate an output signal therefrom whenever a column of the record medium requires a recording according to the different code in the current row; and output means responsive to the output signals from the code conversion means and the timing signals for generating output signals for energizing the recording members corresponding to the respective columns of the current row in which recordings are to be effected.

9. Apparatus for reading out characters expressed in a first code as coded digit signals at the output of a storage device, and recording the characters in a different code on a record medium as represented by recordings in predetermined rows and columns of the record medium, comprising: a plurality of recording members, one associated with each column of the record medium; record medium feeding mechanism for positioning the record medium row-by-row relative to the recording members; row indicating means for producing electric row signals indicative of the row of the record member currently in the recording position; timing means for producing timing signals defining the time period during which a character is currently at the output of the storage device and identifying the columns of the record medium; conversion means comprising a first array of bistable magnetic cores, one corresponding to each of the characters on the output of the storage device, each core being wound with a bias winding, an output winding, a drive winding including means effective to induce a switching signal thereon in response to preselected ones of the coded digit signals from the storage device, a plurality of inhibit windings each responsive to a different combination of the remainder of the coded digit signals from the storage device, and a plurality of further inhibit windings, responsive to a different combination of the row signals, such that whenever a character is read out from the storage device, any core of the array which has no signals present in the inhibit or further inhibit windings thereof will be switched by the signal on the drive winding to the opposite state to produce an output signal in the output winding thereof; and output means responsive to the output signals from the code conversion means and the current timing signals for generating an output signal for energizing that recording member corresponding to the column of the current row in which the recording is to be effected.

10. Apparatus as claimed in claim 9 wherein the first array has associated therewith an auxiliary array of bistable magnetic cores, one corresponding to each of the character output from the storage device, each said latter cores being wound with bias, output, drive and inhibit windings wound identically with those wound on the cores of the first array, and each core of the auxiliary array being wound with a plurality of further inhibit windings responsive to said row signals and wound complementarily to the further inhibit windings wound on the cores of the first array, such that whenever the said different code indicates that a recording is not required in the column of the current row corresponding to the current timing signal, an output signal is generated in the output winding of the cores of the auxiliary array in response to the coded digit and row signals applied to the cores of the auxiliary array from the storage device and row indicating apparatus respectively; a comparison network for comparing signals indicative of the conditions existing at the outputs of the first and auxiliary arrays; and an error indicating circuit responsive to the result of the comparison for producing an error output signal if output signals are simultaneously generated by the first and auxiliary arrays or if neither array generates an output signal.

11. Apparatus for reading out characters expressed in a first code as coded digit signals at the output of a storage device, and recording the characters in a different code on a record medium as represented by recordings in predetermined rows and columns of the record medium, comprising: a plurality of recording members, one associated with each column of the record medium; a feeding mechanism for positioning the record medium row-by-row relative to the recording members; row indicating apparatus for producing row signals indicative of the row of the record medium currently in the recording position; timing means for producing timing signals defining the time period during which a character is currently at the output of the storage device and identifying the columns of the record medium; driving means for supplying core switching signals; first array of bistable magnetic elements, one corresponding to each of the characters output from the storage device, each element being wound with an output winding, a driving winding adapted to be supplied with a switching signal from said driving means, and inhibit windings adapted to be supplied with preselected ones of the coded digit and row signals, to switch the element corresponding to the character output from the storage device and produce and output signal on the output winding thereof only when the said different code indicates that a recording is to be made in the column of the current row corresponding to the current timing signal; a second array of bistable magnetic elements corresponding to the number of columns on the record medium, each said latter element being wound with an output winding, a driving winding adapted to be supplied with output signals from the first array, and inhibit windings adapted to be supplied with timing signals, to produce an output signal on the output winding from that element corresponding to the column in which a recording is to be made during the current timing signal period; and means interconnecting the output windings of the second array and the recording members for actuating that recording member associated with the column which is to receive the recording.

12. Apparatus for reading out characters expressed in a first code as coded digit signals at the output of a storage device, and recording the characters in a different code on a record medium as represented by recordings in predetermined rows and columns of the record medium, comprising: a plurality of recording members, one associated with each column of the record medium; a feeding mechanism for positioning the record medium row-by-row relative to the recording members; row indicating apparatus for producing electric row signals indicative of the row of the record medium currently in the recording position; timing means for producing timing signals defining the time period during which a character is currently at the output of the storage device and identifying the columns of the record medum; conversion means comprising a first array of bistable magnetic cores, one corresponding to each character output of the storage device, each core being wound with a bias winding, an output winding, a drive winding impressed with a switching signal from a driving source in response to preselected ones of the coded digit signals from the storage device, a plurality of inhibit windings each responsive to a different combination of the remainder of the coded digit signals from the storage device, and a plurality of further inhibit windings responsive to a different combination of the row signals, such that whenever a character is read out from the storage device, any core of the array which has no signals present in the inhibit or further inhibit windings thereof will be switched by the signal on the drive winding to the opposite state to produce an output signal in the output winding thereof; a plurality of latching circuits, each latching circuit being connected to a different one of the recording members; output means comprising an array of bistable magnetic cores, one for each column of the record medium, each said latter core having a bias winding, a drive winding responsive to output signals from the conversion means, at least one inhibit winding responsive to a timing signal generated by the timing means, and an output winding connected to a different one of said latching circuits, such that whenever a core in the output means receives a signal on the drive winding thereof during a time period defined by the timing signal to which the inhibit winding of the core is responsive, that core is switched to the opposite state to produce an output signal in the output winding thereof, to trigger the associated latching circuit, so as to energize the recording member associated with the column corresponding to the said timing period.

13. Apparatus as claimed in claim 12, wherein the cores of the array of said output means are responsive to the output signals from the conversion means, the current timing signals, and gating signals generated by the timing means only during a first read-out cycle during which the characters corresponding to the number of columns on the record medium are read out from the storage device; said output means having associated therewith a second array of bistable magnetic cores responsive to said current timing signals, to the output signals from the output means, and to further gating signals generated by the timing means only during a second read-out cycle of the characters from the storage device; a comparison network responsive to said further gating signal for comparing signals indicative of the conditions existing at the outputs of the conversion means and the second array during said second read-out cycle; and an error indicating circuit responsive to the result of the comparison for producing an error output signal if output signals are simultaneously generated by the conversion means and second array or if neither generate an output signal.

References Cited in the file of this patent

UNITED STATES PATENTS

| | | |
|---|---|---|
| 2,672,287 | Reitfort | Mar. 16, 1954 |
| 2,702,380 | Brustman et al | Feb. 15, 1955 |
| 2,708,267 | Weidenhammer | May 10, 1955 |
| 2,774,429 | Rabenda | Dec. 18, 1956 |

OTHER REFERENCES

IBM Technical Disclosure Bulletin, Aug. 29, 1958, vol. 1, No. 2, "Line Selecting Apparatus."

UNITED STATES PATENT OFFICE
CERTIFICATION OF CORRECTION

Patent No. 2,964,238 December 13, 1960

Kenneth O. King et al.

It is hereby certified that error appears in the above numbered patent requiring correction and that the said Letters Patent should read as corrected below.

Column 3, line 3, for "d g ts" read -- digits --; column 5, line 2, for "and" read -- to --; line 41, for "$-H_2$" read -- $-H_1$ --; column 6, line 19, for "inhibting" read -- inhibiting --; line 32, for "slop" read -- slope --; column 9, line 29, for "current" read -- currents --; column 11, line 39, strike out "the", second occurrence; line 62, after "data" strike out the comma; column 12, line 46, for "cenverting" read -- converting --.

Signed and sealed this 30th day of May 1961.

(SEAL)
Attest:

ERNEST W. SWIDER
Attesting Officer

DAVID L. LADD
Commissioner of Patents